US012576421B2

(12) United States Patent
Verdu Alvaro

(10) Patent No.: US 12,576,421 B2
(45) Date of Patent: Mar. 17, 2026

(54) MANUAL PAINT APPLICATION SYSTEM

(71) Applicant: Valver Air Speed, S.L., Valencia (ES)

(72) Inventor: Ricardo Verdu Alvaro, Valencia (ES)

( * ) Notice: Subject to any disclaimer, the term of this patent is extended or adjusted under 35 U.S.C. 154(b) by 0 days.

(21) Appl. No.: 18/730,133

(22) PCT Filed: Jan. 13, 2023

(86) PCT No.: PCT/ES2023/070016

§ 371 (c)(1),
(2) Date: Jul. 18, 2024

(87) PCT Pub. No.: WO2023/139302

PCT Pub. Date: Jul. 27, 2023

(65) Prior Publication Data

US 2025/0144662 A1 May 8, 2025

(30) Foreign Application Priority Data

Jan. 19, 2022 (ES) ................................ ES202230037

(51) Int. Cl.

| | |
|---|---|
| ***B05C 11/10*** | (2006.01) |
| ***A46B 11/06*** | (2006.01) |
| ***B05C 1/00*** | (2006.01) |
| ***B05C 11/11*** | (2006.01) |
| ***B05C 17/00*** | (2006.01) |
| ***B05C 17/03*** | (2006.01) |

(52) U.S. Cl.
CPC ........ *B05C 11/1002* (2013.01); *A46B 11/063* (2013.01); *B05C 1/00* (2013.01); *B05C 11/1039* (2013.01); *B05C 11/11* (2013.01); *B05C 17/002* (2013.01); *B05C 17/0333* (2013.01); *A46B 2200/202* (2013.01)

(58) Field of Classification Search
CPC ... B05C 11/11; B05C 17/002; B05C 17/0333; B05C 11/1002; B05C 1/00; B05C 11/1039; A46B 11/063; A46B 2200/202; A46B 11/06; A46B 11/0072; A46B 11/0079
USPC .................... 401/6, 188 R, 289, 270, 282, 48
See application file for complete search history.

(56) References Cited

U.S. PATENT DOCUMENTS

| | | | | |
|---|---|---|---|---|
| 4,424,011 A * | 1/1984 | O'Brien | B05C 17/0308 | 401/149 |
| 5,054,947 A * | 10/1991 | Frank | B05C 17/002 | 401/149 |
| 2006/0120794 A1* | 6/2006 | Scott | B05C 17/002 | 401/188 R |
| 2007/0217856 A1* | 9/2007 | Kott | B05C 17/0308 | 401/48 |

FOREIGN PATENT DOCUMENTS

| | | |
|---|---|---|
| CN | 204656880 U | 9/2015 |
| CN | 207463576 U | 6/2018 |
| CN | 208727915 U | 4/2019 |

* cited by examiner

*Primary Examiner* — Paul R Durand
*Assistant Examiner* — David J Walczak

(57) ABSTRACT

A manual painting device (brush/roller) allows surfaces to be coated continuously without the brush or roller having to be dipped manually in order to be loaded with paint. The kit can be mounted on a trolley/structure for transport or can be used in a backpack with a tank connected to a pump and from which the paint flows automatically, conveyed through a hose to the applicator element (brush/roller), such that the applicator element is loaded automatically from inside the painting accessory itself.

18 Claims, 9 Drawing Sheets

MANUAL PAINT APPLICATION SYSTEM

OBJECT OF THE INVENTION

The present invention relates to a new range of manual paint application systems (brush/roller) with automatic loading.

The product is a manual painting kit (brush/roller) that allows surfaces to be coated continuously without the brush or roller having to be dipped manually. The kit can be mounted on a trolley/structure for transport or can be used in a backpack with a tank of suitable capacity from which the paint flows automatically, conveyed through a hose to the applicator element (brush/roller), such that the applicator element is loaded automatically.

BACKGROUND OF THE INVENTION

In the field of practical application of the invention, i.e., the field of manual paint application devices such as brushes and/or rollers, both the brush and the roller have to be dipped manually in the corresponding paint can or paint drip tank, and this entails a problem in which the following should be highlighted:

- The maneuver of dipping the brush or roller in paint entails a significant waste of time since it must be done repeatedly, in addition to having to constantly move the paint container.
- It entails the generation of splashes and possible staining of areas or elements not protected from the paint.
- It requires bending down towards the paint container continuously which, from the viewpoint of fatigue, negatively affects precision in paint application due to exhaustion and occupational safety at work, since sometimes both hands are occupied while climbing a ladder, for example.

SUMMARY OF THE INVENTION

The manual paint application system of the invention solves the problem set forth above in a fully satisfactory manner based on a highly effective solution.

To that end, and more specifically, the invention relates to a manual painting kit (brush/roller) that allows surfaces to be coated continuously without the brush or roller having to be dipped manually.

The kit can be mounted on a trolley/structure for transport or can be used in a backpack with a tank of suitable capacity from which the paint flows automatically, conveyed through a hose to the applicator element (brush/roller), such that the applicator element is loaded automatically.

The kit can be coupled to a high-capacity bucket if there is a need to cover large surfaces. Optionally, mainly in the electric trolley model, paint supplied by the paint manufacturer can be suctioned directly from the tank itself without needing a 500 ml bottle.

The product is characterized by having a system made up of a suction pump that drives liquids of certain viscosity such as paints, automatically and continuously, feeding the different brush/roller application systems.

The electronics will be integrated in a case or casing that also includes a practicable tank from which the paint will be gradually suctioned, allowing paint to be changed quickly.

The device will be powered by means of connection to the power grid or by means of a rechargeable battery connected to the casing itself.

The amount of paint to be loaded and supplied to/by the brush or roller will be regulated with respective potentiometers.

The casing can be materialized/integrated in a backpack in which the kit is housed and which allows the user to comfortably transport same while painting.

The power supply system can be controlled through a wireless control.

Upon enabling the system to stop, the system is provided with an automatic reverse rotation of the pump so that the drive tube becomes a suction tube and the paint remaining in the conduit is prevented from flowing through the brush/roller continuously.

Likewise, a switch for the continuous reverse operation of the pump is enabled for cleaning thereof and for the recovery of paint to the suction tank in order to prevent paint wastage and minimize toxic waste.

The paint flows from the kit through a hose through which paint is conveyed to the application system (brush/roller).

It has been envisaged that the device has a range of interchangeable brush/roller heads that have been shape- and size-optimized for reducing production costs and are mounted in their corresponding handle depending on their size.

More specifically, the invention will include interchangeable brush heads, which are used for distributing and depositing paint on different surfaces, brush heads with a flat sash brush coupling, which can be used for painting trimming by performing straight painting, and roller coupling heads.

In terms of the handles used, they have a body through which the connection tubing passes from the lower part thereof where the clamping system is located to the upper part thereof where a threading system on which the different heads are mounted is located.

A highly versatile, effective, and easy-to-use kit which allows saving time and efforts is thus achieved, thereby optimizing manual painting maneuvers.

DESCRIPTION OF THE DRAWINGS

To complement the description that will be made below and for the purpose of helping to better understand the features of the invention according to a preferred practical embodiment thereof, a set of drawings is attached as an integral part of said description in which with the following is depicted in a non-limiting illustrative manner.

Finally.

PREFERRED EMBODIMENT OF THE INVENTION

Figure 1:
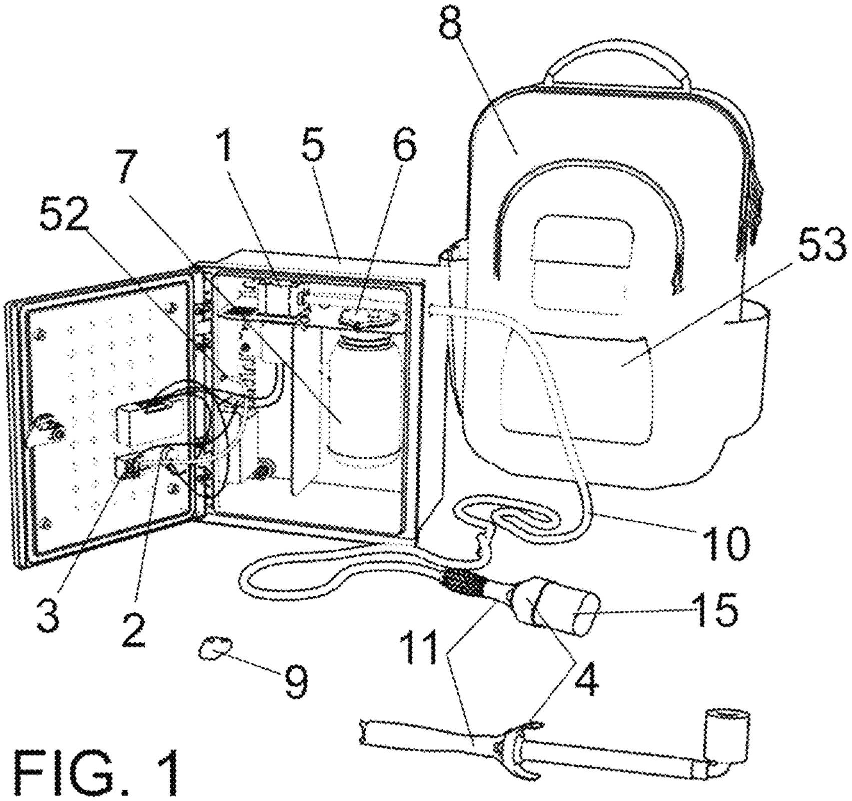
FIG. 1 shows a perspective view of a manual paint application system carried out according to the object of the present invention.

In view of the mentioned figures, and particularly FIG. 1, it can be seen how the system is made up of:

A suction pump (1) which drives liquids of a certain viscosity, such as paints, automatically and continuously, feeding the different application systems (brush/roller) (4).

A case (5) in which all the electronics are integrated, having installed therein a cap (6) adapted and manufactured for the placement of a 500 ml tank (7) from which the paint will be gradually suctioned, allowing paint to be changed quickly. Optionally, paint can be suctioned directly from the tank itself without needing a 500 ml bottle.

A cable for connecting the device (52) to the power grid.

A battery (optional) (53) installed inside the backpack (8) which allows using the device autonomously without using cables or a power grid connection, and this is considered an advantage given that it can be used in places without power from the grid, such as the street.

A potentiometer (2) which allows regulating the amount of paint loaded on the application systems (brush-roller) (4).

Another potentiometer (3) which allows regulating the amount of paint supplied according to application needs.

Optionally, a backpack (8) in which the kit is housed and which allows the user to transport same comfortably while painting is provided.

A wireless control (9) which allows turning the power supply system on and off if the user needs to load or unload paint with respect to the application system (brush/roller) (4).

Upon enabling the system to stop, the system can be provided with an automatic reverse rotation of the pump (1) so that the drive tube or hose (10) thus becomes a suction tube and the paint remaining in the conduit is prevented from flowing through the brush/roller (4) continuously.

Likewise, a switch for the continuous reverse operation of the pump (1) is enabled for cleaning thereof and for the recovery of paint to the suction tank in order to prevent paint wastage and minimize toxic waste.

A hose (10) emerging from the kit through which paint is conveyed to the application system (brush/roller) (4).

A range of brush/roller heads. Said heads have been shape- and size-optimized for reducing production costs. Furthermore, all these interchangeable heads are mounted in their corresponding handle depending on their size.

Figure 2:
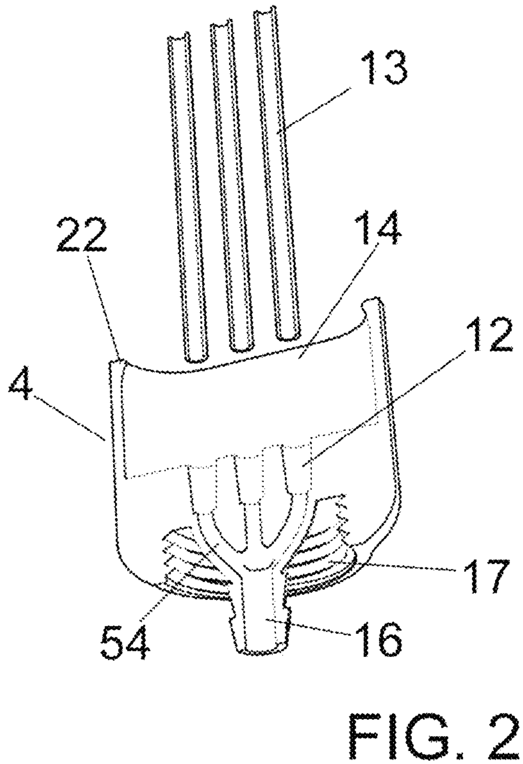
FIG. 2 shows an exploded, section perspective view of a brush head of the kit of the invention.

With respect to the heads, and according to FIG. 2, a first type of interchangeable heads or brush heads with the corresponding handle according to their size, which are used for distributing and depositing paint on different surfaces, has been envisaged.

The brush heads are characterized by having several housings (12) in which a flexible tube (13) is inserted as a means for conveying the paint to the intermediate area of the bristle (15) of the brush without disturbing painting and improving paint distribution.

These flexible tubes (13) can also emerge from the same body of the brush (4) without having to be inserted since they can be provided during the same manufacturing process.

The brush heads have a tank (14) in which the bristles (15) are located and fixed in the head for painting.

The brush heads are characterized by having a hose fitting-type connection (16) in which the hose (10) is coupled and a threaded area (17) that serves for attachment to the handle (11), where the head can be quickly exchanged when required.

The handles and heads can have different measurements and designs depending on the tube or hose (10) used and the purpose of each paint brush or roller.

Figure 4:
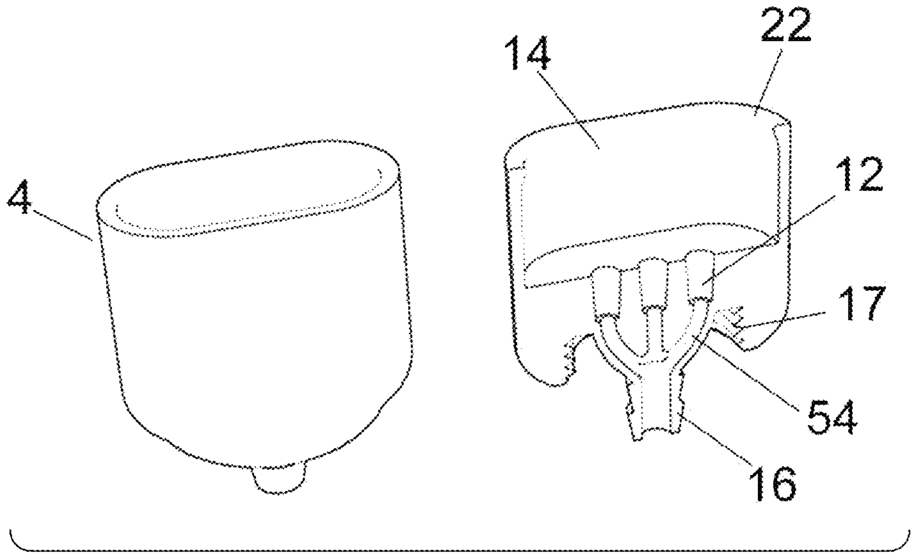
FIG. 4 shows respective outer and inner perspective views of the detail of the head of FIGS. 2 and 3, without the flexible paint applicator tubes.

As shown in FIG. 4, the brush heads have a bevel or perimeter flange (22) at the inner edge of the cavity (14) for directing the bristles to the inner part of the paint brush through which the paint flows, thereby improving paint distribution along the bristles.

The painting heads (4) and handles (11) are provided with inner channels (54) with organic geometries and progressive curvatures such that pressure drops are reduced and conveyance and paint distribution are maximized.

Figure 5:
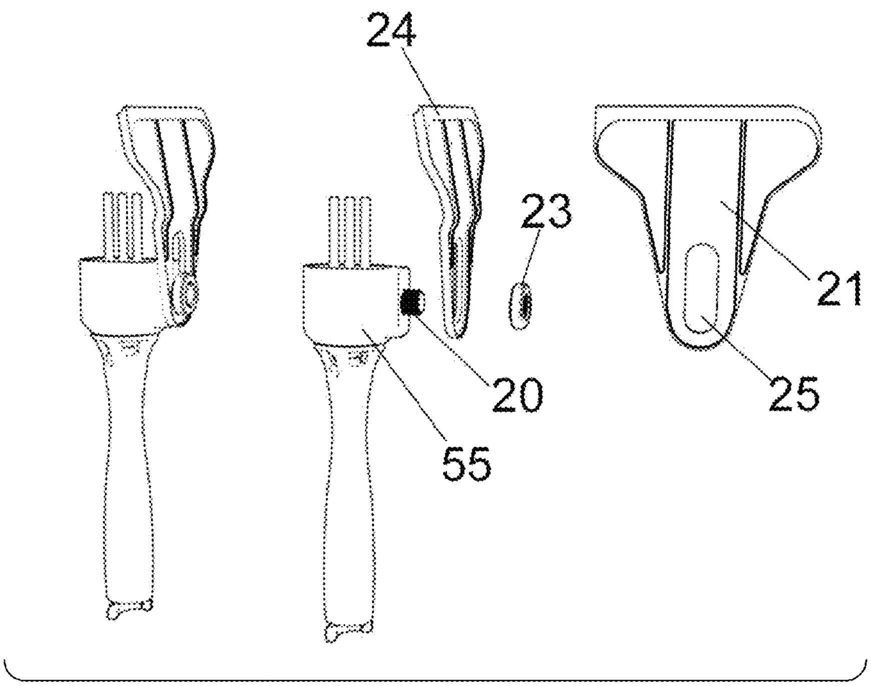
FIG. 5 shows a perspective view, a second exploded perspective view, and a detail of a flat brush of a brush head with a flat sash brush coupling.

Another type of heads envisaged are brush heads with a flat sash brush coupling, such as the one shown in FIG. 5.

The flat brush heads (55) are made up of a threaded projection (20) for coupling flat sash brushes (21) which can be used for painting trimming by performing straight painting. Said flat brushes are secured to the threaded projection (20) by means of a nut (23).

The flat brush is provided with an edge (24) which prevents the outer face of the wall from being painted.

The flat brush is provided with a rail (25) which allows the height regulation thereof when it is mounted on the flat brush head.

Figure 6:
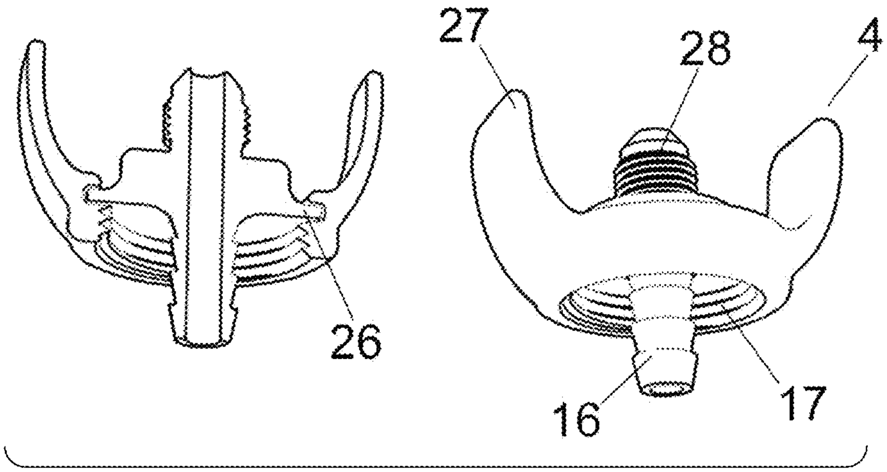
FIG. 6 shows respective section diametral view and outer perspective view of a roller coupling head.
Figure 7:
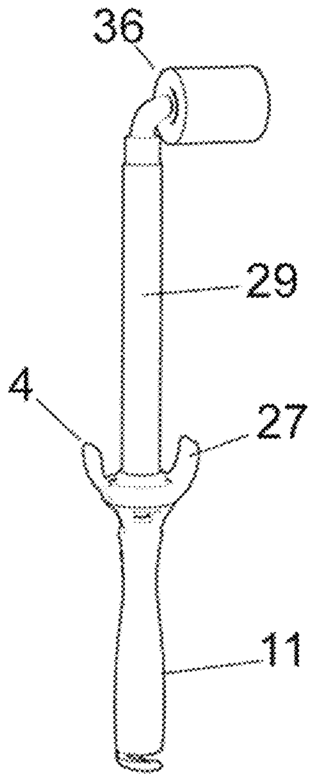
FIG. 7 shows a perspective view of a handle-roller tube-sliding nut-roller assembly.
Figure 8:
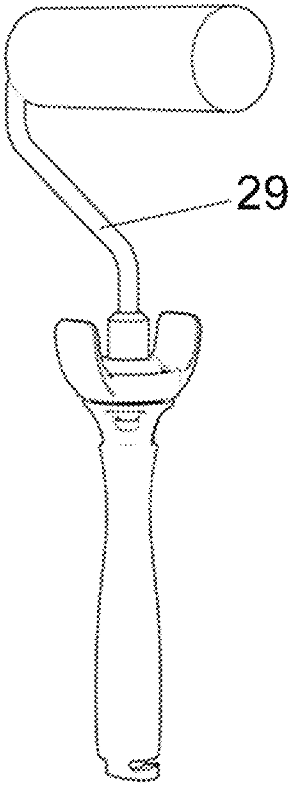
FIG. 8 shows an embodiment variant of the assembly of FIG. 7.

According to FIGS. 6 to 8, another type of heads envisaged are roller coupling heads.

The roller head is characterized by having two parts manufactured and coupled without pressing, generating a movement of the sliding nut (26) before tightening the handle, where the bucket support protuberances (27) can be oriented in the required direction and the painting roller can be positioned correctly.

The roller head has a threaded projection (28) which allows screwing on the roller tube (29), allowing paint to pass through the inner part and feed the inner tank of the roller.

The roller coupling heads can have different measurements and designs depending on the tube or hose (10) and the handle (11) used and according to the purpose of each paint brush or roller.

Figure 3:
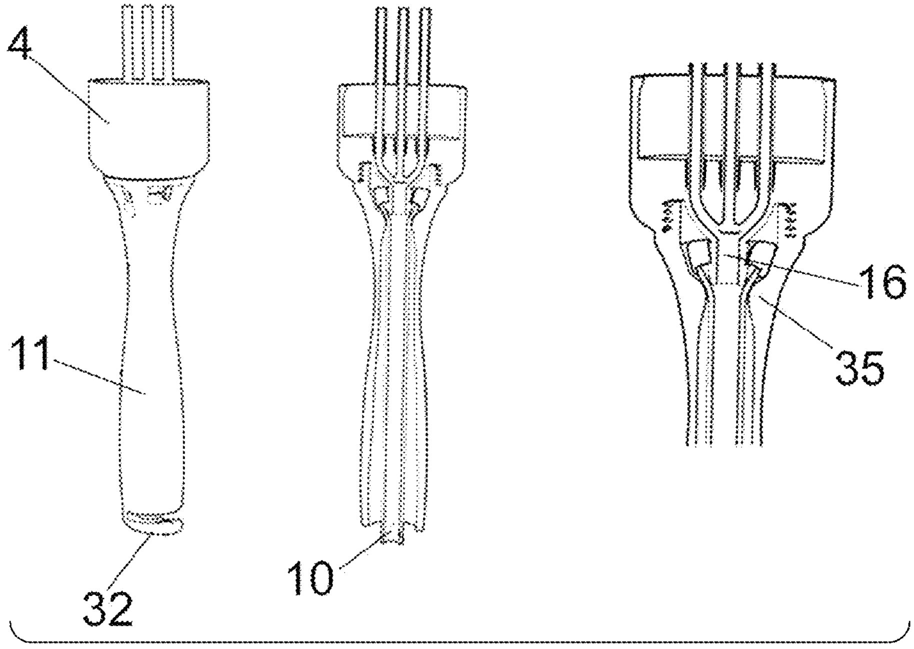
FIG. 3 shows respective section outer perspective views and an enlarged detail of the way to link the brush head to the corresponding handle.
Figure 9:
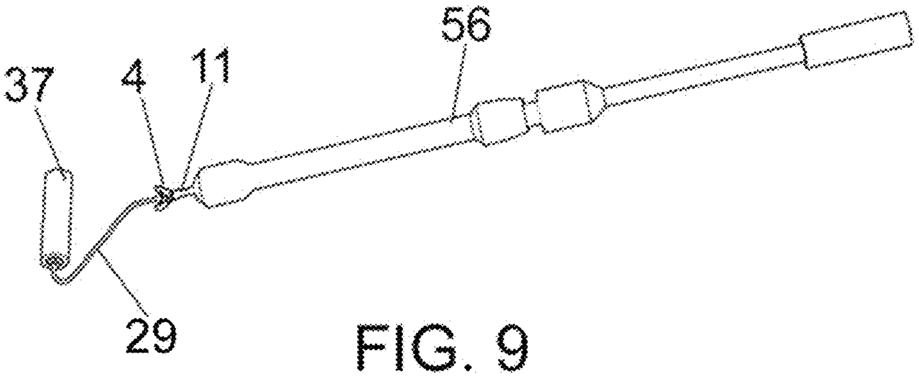
FIG. 9 shows a perspective view of a telescopic handle provided for the roller heads.
Figure 10:
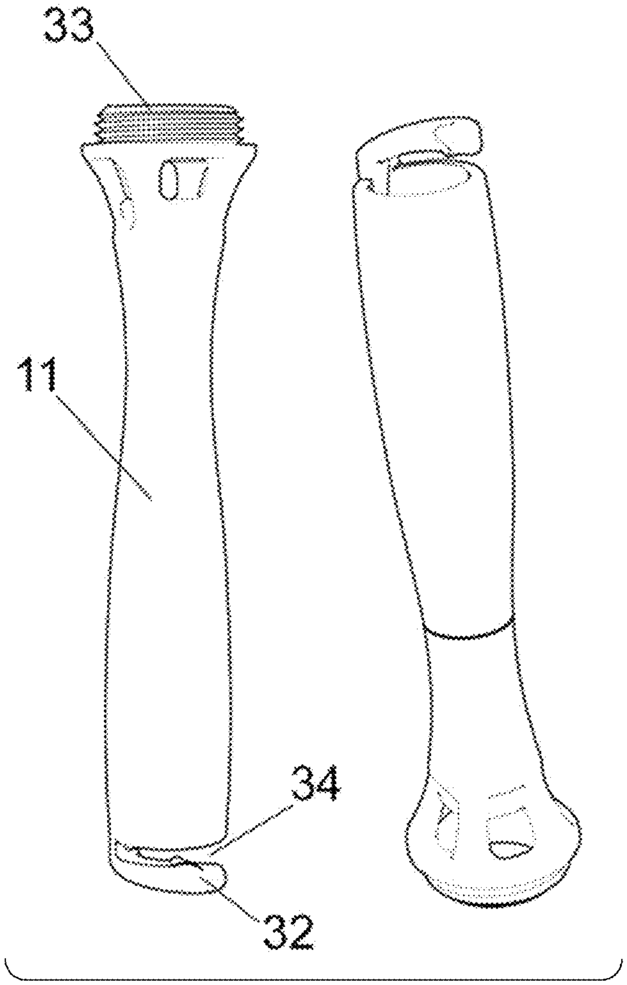
FIG. 10 shows two opposite perspective views of the handle for the non-telescopic version thereof.

In terms of the handle (11) shown in FIGS. 3, 9, and 10, it is manufactured in technical plastic which has been optimized to comply with good ergonomics while painting. The parts are designed based on user's needs-build. This handle has been configured such that it allows interchangeable brush-type heads (4) of a larger or smaller size and even a roller coupling head (4) on which the roller tube (29) of different measurements can be mounted according to the roller to be used, providing the system with great flexibility for painting.

The handles can have different measurements and designs depending on the tube or hose (10) used and the purpose of each paint brush or roller.

The handles have a clamping system (32) with its corresponding rib (34) in the lower part for introducing the tube or hose (10) once painting is completed, such that said tube or hose is restricted and the paint remaining in the conduit is thereby prevented from flowing through the tube when the paint brush used is detached for replacement with another.

The handles (11) have a body through which the hose (10) passes from the lower part thereof where the clamping system (32) is located, to the upper part thereof where there is a coarse thread system (33), on which different heads are mounted, having internally and in the upper portion an annular narrowing (35) in which the hose fits hermetically, at the free end and inside of which the lower end or product inlet (16) of the painting head (4) is coupled.

Figure 11:
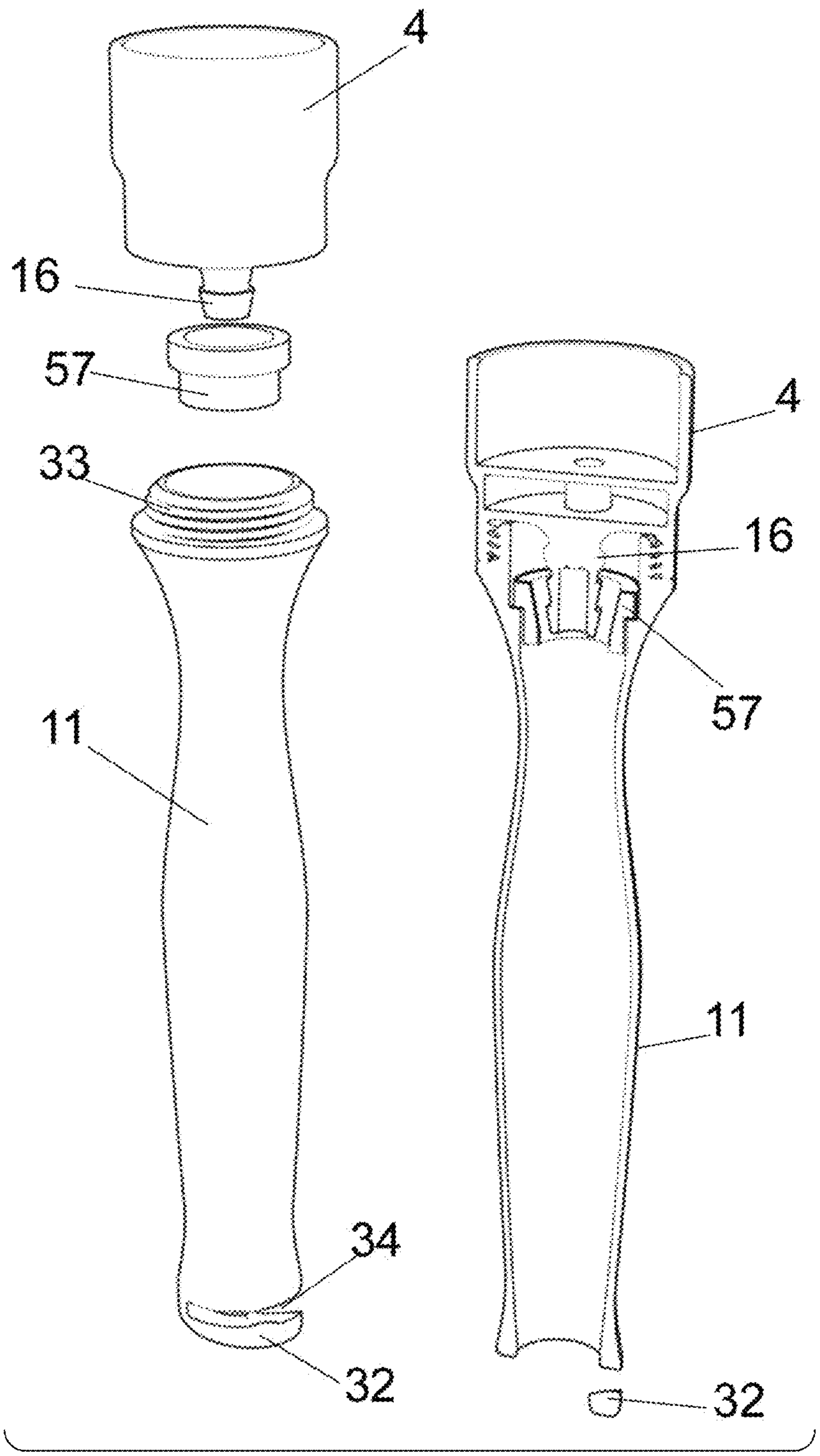
FIG. 11 shows a view similar to that of FIG. 10, but corresponding to an embodiment variant for the handle, specifically for the leak-tight stabilization means of the hose on the inside thereof.

According to the embodiment variant of FIG. 11, the hose can be stabilized in a leak-tight manner by means of a ring (57) made of rubber or the like, concentric to the product inlet (16).

According to FIG. 9, perforated extenders (56) are provided internally for the introduction of paint from one end of the tube to another through the inside thereof, thereby enabling the painting process, without requiring ladders.

Figure 12:
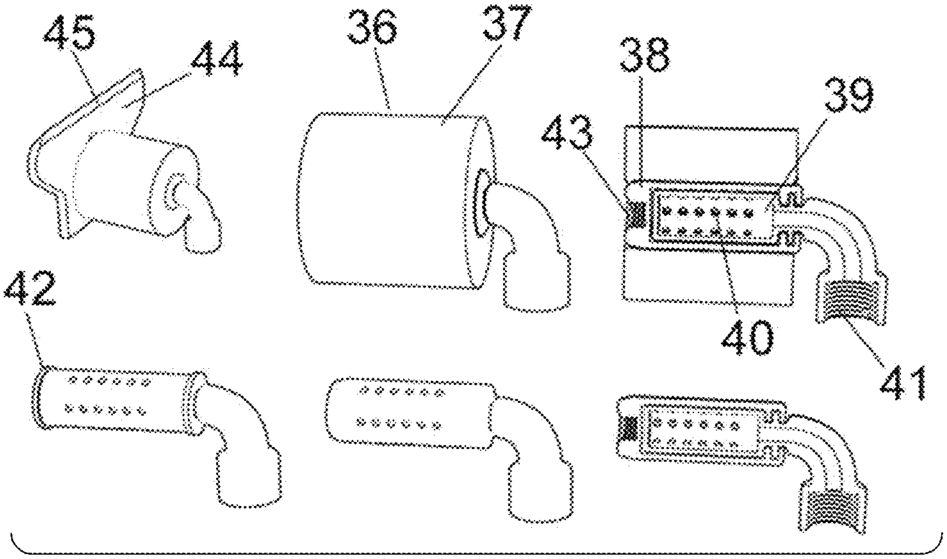
FIG. 12 shows a series of perspective and section views, all of them corresponding to a roller with and without the painting element thereof, and in which the inclusion of an inner chamber for distributing the paint on the painting element can be seen.
Figure 13:
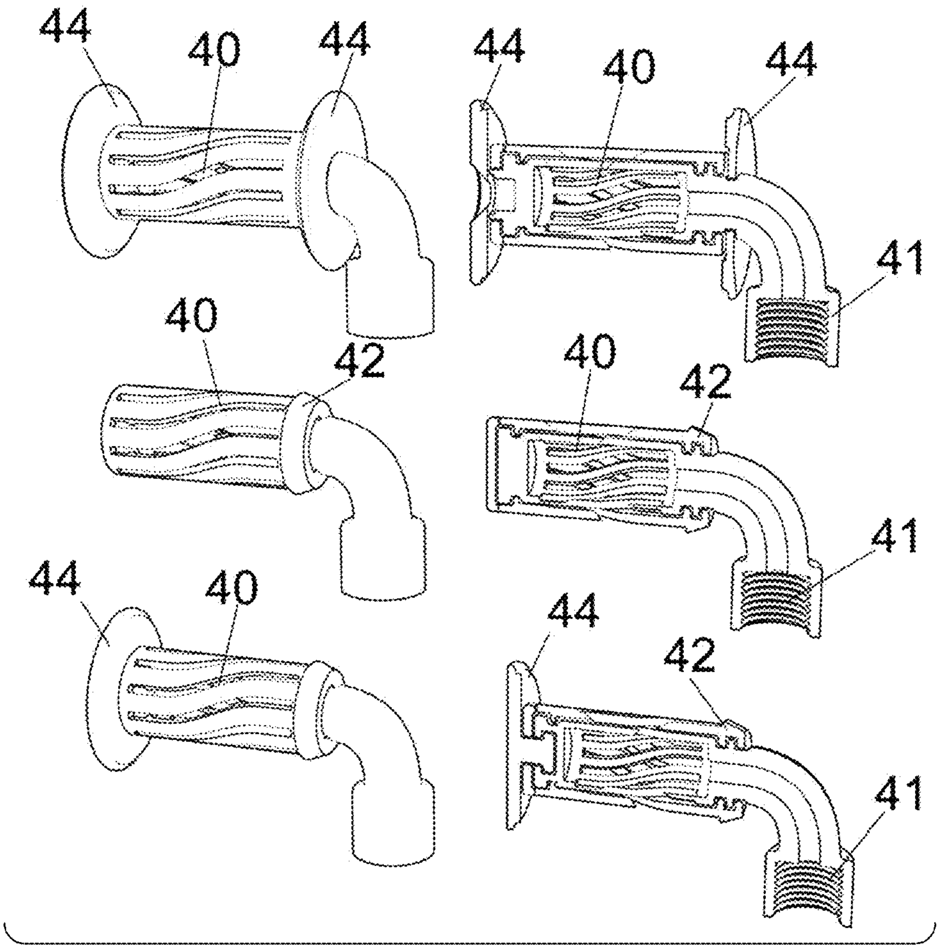
FIG. 13 shows a series of perspective and section views of other three embodiment variants for the roller.

In terms of roller accessories, and as shown in FIG. 12, a roller accessory (36) for mounting on the foam painting element (37) is shown. The roller accessory includes two cylinders, the outer cylinder (38) and the inner cylinder (39), both cylinders being perforated with communicating holes or grooves for the paint (40) according to the need for the outlet and distribution of the paint on the foam painting element (37), the cylinders are independent and free with respect to one another, without requiring mechanical clipping. As they freely rotate with respect to one another when the position of the holes of both cylinders coincides, they allow the passage of pressurized paint coming from the pump (1), from the inner cylinder (39) to the outer cylinder (38), acting as communicating cups for dipping the foam painting element (37). FIG. 13 shows other embodiments of a roller for mounting a foam painting element.

The foam painting element (37) can be manufactured with different materials, measurements, densities, or porosity, according to required needs, function, or work area.

The outer roller (38) may or may not have, externally along the cylinder, small radial flanges (42) for securing the foam painting element (37).

The inner roller may or may not have, at the end opposite the product inlet, a hole for securing flat sash brushes (44), where this can be carried out with a female thread by means of clipping or in an integral manner during the manufacture of the inner roller (39) for securing the different flat sash brushes (44).

In terms of flat sash brushes (44), which are interchangeable with the roller accessory (36), said roller accessory allows for them to be secured by means of a screw, such that they can be manufactured in an integral manner with respect to the roller accessory (36) or with different clipping methods to make changing them quicker and more comfortable.

The flat sash brushes (44) can be provided with different edges (45) that prevent the staining of the outer face of the wall and are adapted according to the functional need of each possible corner or angle of the wall to be painted. At the same time, height regulating means and a rounded end or radius in one of the corners thereof can be included to facilitate the entry of the foam painting element (37) on the surface to be painted without staining the surface to be protected.

Figure 14:
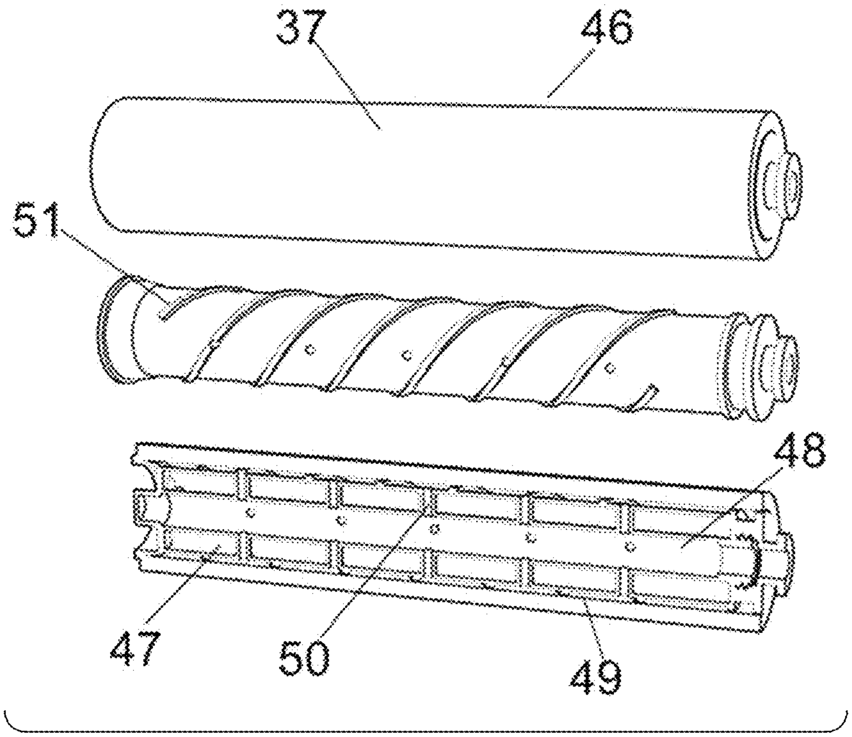
FIG. 14 shows respective perspective views of a roller with and without the painting element, as well as a section view, in an embodiment variant in which the roller incorporates leak-tight air chambers which reduce paint filling up unnecessary spaces.

According to the embodiment variant of FIG. 14, the roller accessory (46) has air chambers (47) to prevent unnecessary volumes of paint from filling up the inside thereof, as well as to relieve the assembly and the painter of weight in order to make it more comfortable and functional. It makes the initial paint loading, as well as the cleaning of the system after finishing the work or when changing color, faster and more comfortable.

The paint inlet chamber (48) and a paint outlet chamber (49) are communicated through tubes (50) distributed along of the roller depending on the design, in the paint outlet chamber (49) the accessory has on its outer face a small lip (51) around the spiral-shaped body for a good distribution of the paint along the roller painting element (37).

Figure 16:
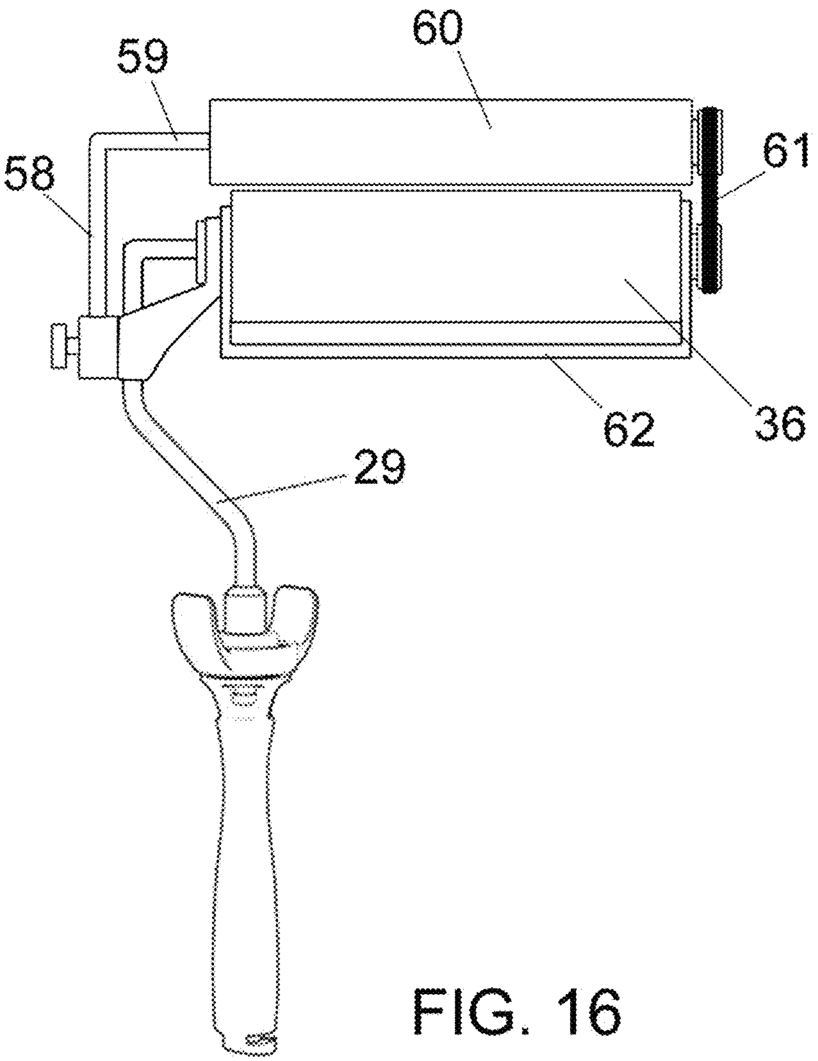
FIG. 16 shows a front elevational view of an embodiment variant for the roller.

According to the embodiment variant of FIG. 16, the roller can optionally allow using another type of conventional rollers, based on the nature thereof, according to the personal likings and preferences of each painter, such that based on the structuring described above, the roller will have a support (58) that can be fixed to the roller itself, such that the support includes a shaft (59) parallel to the main roller, in which the conventional roller (60) will be inserted in a tangential arrangement with respect to same, which is linked to the roller of the invention through the mentioned support (58), as well as a transmission (61) such as, for example, by means of complementary pinions, which allow applying paint from one roller to another, with the conventional roller (60) being the one that will finally come into contact with the surface to be painted.

Obviously, the main roller will be assisted by a shell-like protective casing (62) which prevents the paint from coming out in another direction that is not the direction of the conventional roller (60).

Figure 15:
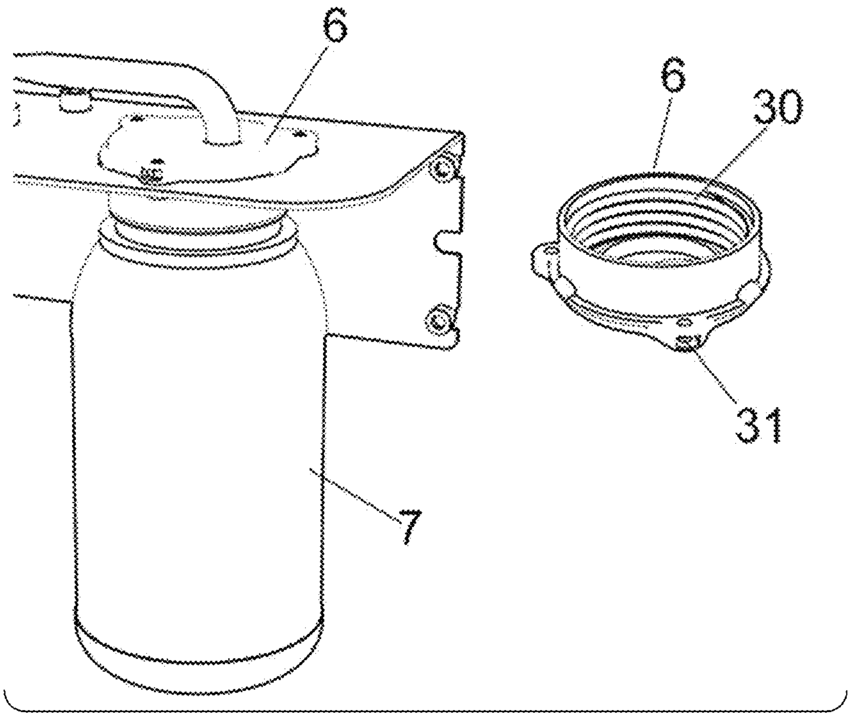
FIG. 15 shows a perspective view of the respective details of the device at the level of the paint tank coupling cap with said tank coupled, and the configuration of said cap.

According to FIG. 15, there is provided a cap (6) (optional) particularly designed with an inner thread (30) for the connection of a 0.5- or 1-liter bottle (7) from which the pump (1) will suction the paint or liquid to be applied with the painting accessories. There are three outer nut holders (31) where nuts are introduced, and the bottle is thus secured to the structure, allowing the bottle to be integral with the system for transport and for using the device autonomously in order to facilitate the painting work without the different tanks supplied by the paint supplier spilling or tipping over.

The invention claimed is:

1. A manual paint application system comprising:

at least one tank for containing a product comprising paint or other liquids, connected to a drive pump, with control electronics, which assembly is integrated in a case that can be included in a backpack, which drive pump is connected to a drive tube or feeding hose for a series of interchangeable painting accessories;

wherein the interchangeable painting accessories comprise brush-type and roller-type head accessories;

wherein the interchangeable painting accessories are fed with the product contained in the tank from a handle thereof and conveying means for conveying said product to bristles of the interchangeable painting accessory when the interchangeable painting accessory is a brush-type head accessory or to a painting element of the interchangeable painting accessory when the interchangeable painting accessory is a roller-type head accessory, comprising regulating means for regulating a flow of the product to be applied;

wherein the control electronics comprise a remote activation control and means for inverting a rotation of the pump, such as a system for backflow and recovery of the product to be applied;

wherein the interchangeable heads comprise a product inlet to which the drive tube or feeding hose is manually connected and a threaded area designed with different measurements in each interchangeable painting accessory so as to be compatible with different handles;

wherein the handles are interchangeable by means of connecting different interchangeable painting accessories;

wherein the handles comprise a lower groove determining means for restricting the hose, which groove has an inner projection or rib;

wherein the handles comprise internally and in an upper portion an annular narrowing in which a free end of the hose fits externally and hermetically;

wherein on an inside of the free end of the hose, there is coupled a lower end or product inlet of the painting head and wherein said handles comprise internally and in the upper portion a ring for leak-tight fixing of the hose, concentric to the product inlet.

2. The manual paint application system according to claim 1, characterized in that the tank is linked to the case through a cap with a complementary inner thread of the tank and through which the tank communicates with the pump, comprising three nut holders for fixing to the case.

3. The manual paint application system according to claim 1, characterized in that the electronics are powered through a rechargeable inner battery.

4. The manual paint application system according to claim 1, characterized in that the electronics are powered through grid connection means.

5. The manual paint application system according to claim 1, characterized in that the heads of the accessories which are fed through the hose include a plurality of outlet conduits, each of them being linked to a flexible or rigid tube which is prolonged into the inside of the painting element.

6. The manual paint application system according to claim 1, characterized in that the brush-type accessories comprise a cavity or tank in which the bristles are located and fixed to a corresponding head, comprising on an upper inner edge thereof a perimeter flange for directing the bristles, once positioned, to a central direction of the paint brush through which the paint flows.

7. The manual paint application system according to claim 1, characterized in that the brush-type accessory includes a projecting male thread in a side or front area of the brush-type accessory for the selective fixing of different flat sash brushes by means of a corresponding nut.

8. The manual paint application system according to claim 7, characterized in that the flat sash brushes include edges determining anti-fouling means for the outer face of the wall, comprising configurations that can be adapted to different corners or angles of the wall to be painted.

9. The manual paint application system according to claim 7, characterized in that the flat sash brushes include height regulating means, as well as a rounded end in one of the corners thereof.

10. The manual paint application system according to claim 1, characterized in that the roller-type head accessory includes a sliding nut for positioning the roller, and protuberances for securing the accessory to the corresponding bucket.

11. The manual paint application system according to claim 1, wherein the roller-type head accessory comprises a hose fitting-type connection in which the hose is coupled and a threaded area for attachment to the handle.

12. The manual paint application system according to claim 1, characterized in that there is mounted on the roller-type head accessory a foam painting element, which accessory includes two cylinders, an outer cylinder and an inner cylinder, both cylinders being perforated with communicating holes or grooves for the paint on the foam painting element, the cylinders being independent and free with respect to one another, without requiring mechanical clipping.

13. The manual paint application system according to claim 12, characterized in that the roller-type head accessory has an inlet to the inner cylinder at an angle.

14. The manual paint application system according to claim 12, characterized in that the outer cylinder externally includes radial flanges for securing the foam painting element.

15. The manual paint application system according to claim 12, characterized in that the roller-type head accessory includes at both ends detachable securing means for flat sash brushes, the flat brush being in a position opposite the position of the product inlet, integral and rotational, without clipping, with respect to the inner cylinder and the flat brush positioned at the same end of the product inlet being rotational and detachable with respect to the inner cylinder.

16. The manual paint application system according to claim 1, characterized in that in the roller-type head accessory, there are established inside the roller painting element air chambers for reducing the weight and the volume of the product on the inside of the accessory.

17. The manual paint application system according to claim 1, characterized in that in the roller-type head accessory, there are defined a paint inlet chamber and a paint outlet chamber which are communicated through tubes distributed along of the roller, wherein in the paint outlet chamber, the accessory comprises an outer face and wherein on the outer face, the accessory comprises a small lip around the spiral-shaped body.

18. The manual paint application system according to claim 1, characterized in that the roller-type head accessory comprises a support provided with means for fixing to the roller, wherein the support comprises a shaft parallel thereto, in which a conventional roller can be selectively inserted, in a tangential arrangement, and which, by means of a transmission, is linked to the roller which has an open shell-like protective casing in correspondence with the area of contact with the conventional roller.

* * * * *